(12) United States Patent
Grödl et al.

(10) Patent No.: US 9,807,892 B2
(45) Date of Patent: Oct. 31, 2017

(54) DRIVE UNIT

(71) Applicant: HOERBIGER AUTOMATISIERUNGSTECHNIK HOLDING GMBH, Altenstadt (DE)

(72) Inventors: Marcus Grödl, Biessenhofen (DE); Berthold Grimmer, Peissenberg (DE); Daniel Haller, Stuttgart-Vaihingen (DE); Bin Lang, Stuttgart (DE); Tobias Rossbach, Stuttgart (DE); Carlos Martinez, Stuttgart (DE); Norbert Zylka, München (DE); Jochen Schaible, Altensteig (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 25 days.

(21) Appl. No.: 14/936,834

(22) Filed: Nov. 10, 2015

(65) Prior Publication Data
US 2016/0066443 A1 Mar. 3, 2016

Related U.S. Application Data

(63) Continuation of application No. PCT/EP2014/001247, filed on May 9, 2014.

(30) Foreign Application Priority Data

May 10, 2013 (DE) .................. 10 2013 007 927

(51) Int. Cl.
*H05K 5/02* (2006.01)
*H05K 7/00* (2006.01)
(Continued)

(52) U.S. Cl.
CPC ........... *H05K 5/0017* (2013.01); *F16K 31/04* (2013.01)

(58) Field of Classification Search
CPC ... G06F 1/1601–1/1611; H05K 5/0017; H05K 5/0086
(Continued)

(56) References Cited

U.S. PATENT DOCUMENTS 5,777,603 A * 7/1998 Jaeger ................ G02F 1/13306
341/23
5,878,765 A 3/1999 Lange
(Continued)

FOREIGN PATENT DOCUMENTS

DE 2713237 A1 10/1977
DE 9406760 U1 8/1994
(Continued)

OTHER PUBLICATIONS

International Search Report, mailed Oct. 15, 2014, for corresponding International Application No. PCT/EP2014/001247.
(Continued)

*Primary Examiner* — Seth W Mackay-Smith
(74) *Attorney, Agent, or Firm* — Myers Wolin, LLC

(57) ABSTRACT

A drive unit is provided, particularly a drive unit for operating flow-control valves, comprising a housing, an electrical input, an electromechanical converter assembly, a mechanical output, and an electronic controller. The controller comprises an input unit having at least one pushbutton, which penetrates the housing and can be depressed against the action of a restoring device, and comprises a contactless switch that is actuated by the at least one pushbutton. A mechanical stop independent of the switch itself is associated with the position of the pushbutton that actuates the switch.

13 Claims, 7 Drawing Sheets

(51) Int. Cl.
  *G06F 1/16* (2006.01)
  *F16K 31/02* (2006.01)
  *H05K 5/00* (2006.01)
  *F16K 31/04* (2006.01)

(58) Field of Classification Search
  USPC .......... 361/679.01–679.02, 679.21, 724–727
  See application file for complete search history.

(56) References Cited

U.S. PATENT DOCUMENTS

| | | | | |
|---|---|---|---|---|
| 6,422,532 | B1* | 7/2002 | Garner | F16K 37/0058 |
| | | | | 137/487.5 |
| 6,546,297 | B1* | 4/2003 | Gaston | G05B 19/0426 |
| | | | | 700/17 |
| 6,587,056 | B1* | 7/2003 | Fraser | H03K 17/97 |
| | | | | 200/11 R |
| 6,642,919 | B1* | 11/2003 | Jaeger | G06F 1/1601 |
| | | | | 345/1.2 |
| 2002/0024507 | A1* | 2/2002 | Boone | A62B 9/006 |
| | | | | 345/173 |
| 2003/0050713 | A1* | 3/2003 | Piersanti | G05B 15/02 |
| | | | | 700/1 |
| 2005/0016592 | A1* | 1/2005 | Jeromson | F16K 3/08 |
| | | | | 137/487.5 |
| 2006/0293797 | A1* | 12/2006 | Weiler | A01G 25/16 |
| | | | | 700/284 |
| 2008/0240694 | A1* | 10/2008 | Okazaki | G03B 17/18 |
| | | | | 396/50 |
| 2008/0290039 | A1* | 11/2008 | King | C02F 1/008 |
| | | | | 210/739 |
| 2012/0081845 | A1* | 4/2012 | Yato | G06F 1/1616 |
| | | | | 361/679.01 |
| 2012/0227983 | A1* | 9/2012 | Lymberopoulos | E21B 34/02 |
| | | | | 166/373 |
| 2013/0181938 | A1* | 7/2013 | Takashima | G06F 3/044 |
| | | | | 345/174 |
| 2013/0219318 | A1* | 8/2013 | Schreiber | B60K 35/00 |
| | | | | 715/771 |
| 2014/0308930 | A1* | 10/2014 | Tran | H04W 4/001 |
| | | | | 455/414.1 |

FOREIGN PATENT DOCUMENTS

| | | |
|---|---|---|
| DE | 19540441 A1 | 4/1997 |
| DE | 19807375 A1 | 6/1999 |
| DE | 102008058364 A1 | 2/2010 |
| EP | 0777327 A1 | 6/1997 |
| EP | 1418343 A1 | 5/2004 |
| EP | 2101061 A1 | 9/2009 |
| GB | 2197075 A | 5/1988 |
| WO | 03042586 A1 | 5/2003 |
| WO | 2011095350 A1 | 8/2011 |
| WO | 2011095351 A1 | 8/2011 |
| WO | 2014180573 A1 | 11/2014 |

OTHER PUBLICATIONS

International Preliminary Report on Patentability for corresponding International Application No. PCT/EP2014/001247 completed Apr. 24, 2015.

* cited by examiner

DRIVE UNIT

CROSS REFERENCE TO RELATED APPLICATIONS

This application is a continuation under 35 U.S.C. §120 of International Application PCT/EP2014/001247, filed May 9, 2014, which claims priority to German Application 10 2013 007 927.6, filed May 10, 2013, the contents of each of which are incorporated by reference herein.

FIELD OF THE INVENTION

The present invention relates to a drive unit, especially for actuation of flow-regulating valves, comprising a housing, an electrical input, an electromechanical transducer group, a mechanical output and an electronic controller.

BACKGROUND

Drive units of the type mentioned in the foregoing used for actuation of flow-regulating values are known in diverse alternative embodiments in the prior art. In this connection, the following publications may be cited as examples: DE 19540441 A1, WO 2011/095351 A1, EP 2101061 A1, DE 9406760 U1, EP 1418343 A1 and WO 2011/095350 A1.

SUMMARY

Starting from the prior art outlined in the foregoing, the object of the present invention is to provide a drive unit of the type indicated in the introduction, which in the interests of increased process safety of systems that—especially for actuation of flow-regulating valves—are equipped with such drive units, is characterized by improved ease of operator control and handling.

This object is achieved according to the present invention by the fact that, in a drive unit of the type mentioned in the introduction, the controller comprises an input unit with at least one pushbutton that penetrates the housing and can be depressed against the action of a restoring device and a contactless switch actuated thereby, and a mechanical stop independent of the switch itself is assigned to the position of the pushbutton actuating the switch. In other words, the inventive drive unit is characterized by specific devices, by means of which an operator-control person can exert an influence on the function of the drive unit from outside, namely by the provision of a pushbutton, which can be actuated by the operator-control person, which penetrates the housing and which can be depressed as far as a mechanical stop against the action of a restoring device. This stop is independent of a switch, which forms part of the controller, is designed to be contactless and can be actuated by the pushbutton. In this way the present invention takes several circumstances relevant to practice into account. These include the fact that, on the one hand, an influence on the controller of the drive unit is frequently exerted in operation situations in which a danger must be averted or an irregular operating condition ended, wherein operator control of the drive unit in such situations typically does not take place smoothly and calmly but instead somewhat hectically. On the other hand, the operator-control persons often wear protective garments, especially protective gloves, in systems equipped with such drive units. These typically hinder sensitive operator control of the drive unit. By the embodiment of the drive unit according to the present invention, it is ensured that even a relatively coarse influence—which if necessary takes place in an actual or presumed emergency situation—on the input unit that acts on the controller of the drive unit does not lead to damage in the controller, precisely because the depression of the pushbutton is limited by a mechanical stop independently of the switch actuated by the pushbutton, and in addition the switch itself operates contactlessly. Even during extremely rough influence, already exceeding the range of proper actuation of the pushbutton, the switch therefore remains intact and damage of the electronic switch by improper operation is excluded. This favors the reliability of the drive unit, thus representing a considerable gain in engineered safety compared with the prior art.

According to a first preferred improvement of the present invention, the switch is of optical design, especially by comprising a photoelectric barrier. This permits particularly reliable switching behavior even under unfavorable external conditions; and a switching element (interrupter) penetrating into the optical measurement path of the photoelectric barrier can be actuated superbly by the pushbutton designed according to the present invention. The switching element may even be disposed or formed on the pushbutton, especially on its end face. However, the switching element may also represent a component independent of the pushbutton. The optical switch, switching element and pushbutton are then matched to one another in such a way that the switching element (still) does not contact the switch even when the pushbutton, during actuation thereof, strikes the mechanical stop assigned to it.

Another preferred improvement of the present invention is characterized in that the switch is disposed directly on a printed-circuit board supporting further components of the electronic controller. This embodiment, which permits particularly compact constructions, is possible precisely because of the fact that, during application of the present invention, it is not possible for actuation of the pushbutton, even if violent, to damage the switch or the printed-circuit board supporting it due to exertion of excessive force.

According to yet another preferred improvement of the invention, the housing of the drive unit is of explosion-protected design and the pushbutton is sealed relative to the housing by means of a sealing system in such a way that this on the one hand forms reliable protection against ingress of liquid or even dust-containing media, but on the other hand also ensures maintenance of the maximum air gap, relevant for explosion protection, between housing and pushbutton (ATEX gap). This sealing system may in particular be of cascade-like design and comprise a double seal. Especially for applications subject to explosion-protection requirements, the present invention can be applied particularly advantageously, since the explosion-protected sealing of the pushbutton relative to the housing and the force-displacement characteristic typically resulting from this during depression of the pushbutton does not lead—as follows from the foregoing explanations of the present invention—to a danger to the switch actuated by the pushbutton as a result of exertion of inadmissibly high force.

Yet another preferred improvement of the present invention is characterized in that the restoring device (of the pushbutton) comprises a two-stage restoring-spring unit acting in the manner of a pressure point. Accordingly, the pushbutton can first be depressed against a relatively small resistance, until it reaches a pressure point, from which depression of the pushbutton is possible only with exertion of significantly greater force. This has a positive effect on actuation of the input unit of the drive unit by an operator-control person wearing protective garments, especially protective gloves, since such a person, even while wearing heavy protective gloves, receives noticeable "feedback" via the said pressure point during actuation of the input unit of the drive unit.

Particularly preferably, the mechanical stop, independent of the switch, which limits the depression travel of the pushbutton, is adjustable. This ensures that—by appropriate adjustment of the stop—specific boundary conditions of the respective area of use can be taken into account. Thus it is practical, especially for use in systems seriously jeopardized by soiling, or under inhospitable climatic conditions, to provide a large actuation travel, which for applications in the laboratory environment would instead be sensed as troublesome. In addition, optimum matching between the pushbutton and the switch actuated thereby is possible, in order to adapt the pushbutton to the respective assigned switch. This favors reliability of the function.

The present invention can be applied particularly advantageously in such drive units in which the electronic controller has an electronic display, in which case it is particularly preferable for the input unit to comprise several pushbuttons disposed adjacent to the display. In particular, this display may (also) be set up to indicate the switching functions assigned to the individual pushbuttons. In this respect, according to yet another further-reaching preferred improvement of the invention, it is useful when the assignment of the switching functions active in the controller to the individual pushbuttons can be varied. Such a change of the assignment of the switching functions active in the controller to the individual pushbuttons is advantageous from several viewpoints. On the one hand, in menu-driven controllers, the switching functions may be changed depending on the respective level of the menu. On the other hand, the allocation of defined switching functions to the individual pushbuttons may be made dependent on the respective installation situation of the drive unit. For example, it is possible in this way, independently of the installation position of the drive unit (vertical, horizontal, hanging), which often cannot be chosen freely but instead is imposed by the system environment, to provide emergency actuation that always takes place at a defined position (e.g. top left), by allocating it to a pushbutton disposed there. This is in turn an important aspect relevant for safety, because in a danger situation the emergency switch—disposed consistently (e.g. top left) for all drive units of the system despite different installation positions—can be actuated automatically and instinctively without the need to read the display. This means that, even under unfavorable reading conditions (darkness because of power outage, visual impairment by smoke), the pushbutton essential for emergency shutdown of the drive unit can be located and actuated reliably.

The variable assignment, explained in the foregoing, of the switching functions active in the controller to the individual pushbuttons, may be achieved manually, i.e. typically may be defined or adjusted during erection of the system. Nevertheless, according to a preferred improvement of the invention, it is possible to provide an installation-position sensor, wherein the switching functions are automatically allocated in the controller to the individual pushbuttons in a manner dependent on the signal of the installation-position sensor. In this case the safety-relevant aspect explained in the foregoing cannot be suppressed by an incorrect setting during erection of the system.

Within the meaning of the capability shown hereinabove of indicating the switching function allocated to the individual pushbuttons in the display adjacent to which the pushbuttons are disposed, the display, according to yet another preferred improvement of the invention, may comprise an operating-information area and at least one actuation-information area adjacent to the pushbuttons, wherein the current assignment of functions to the individual pushbuttons is indicated in the actuation-information area or areas. It is then particularly favorable for the display to have an oblong format and pushbuttons, of which at least two are provided, to be disposed (in groups if necessary) on the two short sides of the display, while the display has a central, substantially square operating-information area and two laterally disposed actuation-information areas. By the fact that the operating-information area, in which, for example, operating data and/or information about the operator-control menu are displayed, has substantially square shape, a representation of the operating information is in turn possible independently of the respective installation position of the drive unit; i.e. the operating information is communicated to the operator in a consistent representation, independently of whether the drive unit is installed in vertical, horizontal or hanging relationship. In this connection, an installation-position sensor may in turn be useful, wherein the orientation of the indication of operating information in the operating-information area of the display is determined automatically depending on the signal of the installation-position sensor.

In the interests of remote monitoring and/or remote actuation, the controller of the drive unit otherwise preferably has an interface for wireless data transmission. In this case, the time and effort associated with laying appropriate signal and control lines for hard-wired data transmission is obviated. In addition, it is possible in this way to view and process operating information, especially from an unfavorable installation situation, at a readily accessible location independent of the equipment.

The present invention can obviously be applied advantageously for the most differently designed drive units. However, a particularly preferred improvement of the drive unit in this respect is characterized in that the electromechanical transducer group is designed in two stages, by the fact that it comprises an electrofluidic first transducer stage and a fluid-mechanical second transducer stage. Safety-relevant aspects such as, for example, the possibility of supplying fluidic energy for emergency actuation (in the event of failure of the power supply), argue for such a design of the drive unit, wherein the various safety-relevant aspects and advantages of the present invention explained hereinabove in the introduction act synergistically in beneficial manner, particularly here.

In other respects, a mode-of-operation switch, by means of which it is possible to change over, for example, between an automatic or remotely actuated influence on the drive unit on the one hand and a manual influence on the drive unit on the other hand, may be mounted on the housing to be actuated from the outside and act on the controller. In order to prevent inadvertent maladjustment of the mode-of-operation switch, this may in particular be mechanically interlocked. It may also be designed to be lockable, so that only authorized persons are able to make adjustments to the mode-of-operation switch.

As follows from the foregoing explanations and is merely emphasized once again here for completeness, the present invention is applicable to the most diverse drive units. For example, the mechanical output of the drive unit may execute a linear motion, a rotary motion or some other motion. Furthermore, in the case of a two-stage electromechanical transducer group with an electrofluidic first transducer stage, an electrohydraulic or an electropneumatic first transducer stage may be used. The restoring devices acting on the pushbuttons may also be designed in the most diverse manners, i.e. instead of mechanically, for example, also pneumatically, hydraulically, electrically or the like. Furthermore, a broad bandwidth of possible technical embodiments also exists for the design of the contactlessly operating switch.

BRIEF DESCRIPTION OF THE DRAWINGS

The present invention will be explained in more detail hereinafter on the basis of two exemplary embodiments illustrated in the drawing, wherein.

DETAILED DESCRIPTION OF THE PREFERRED EMBODIMENTS

Figure 1:
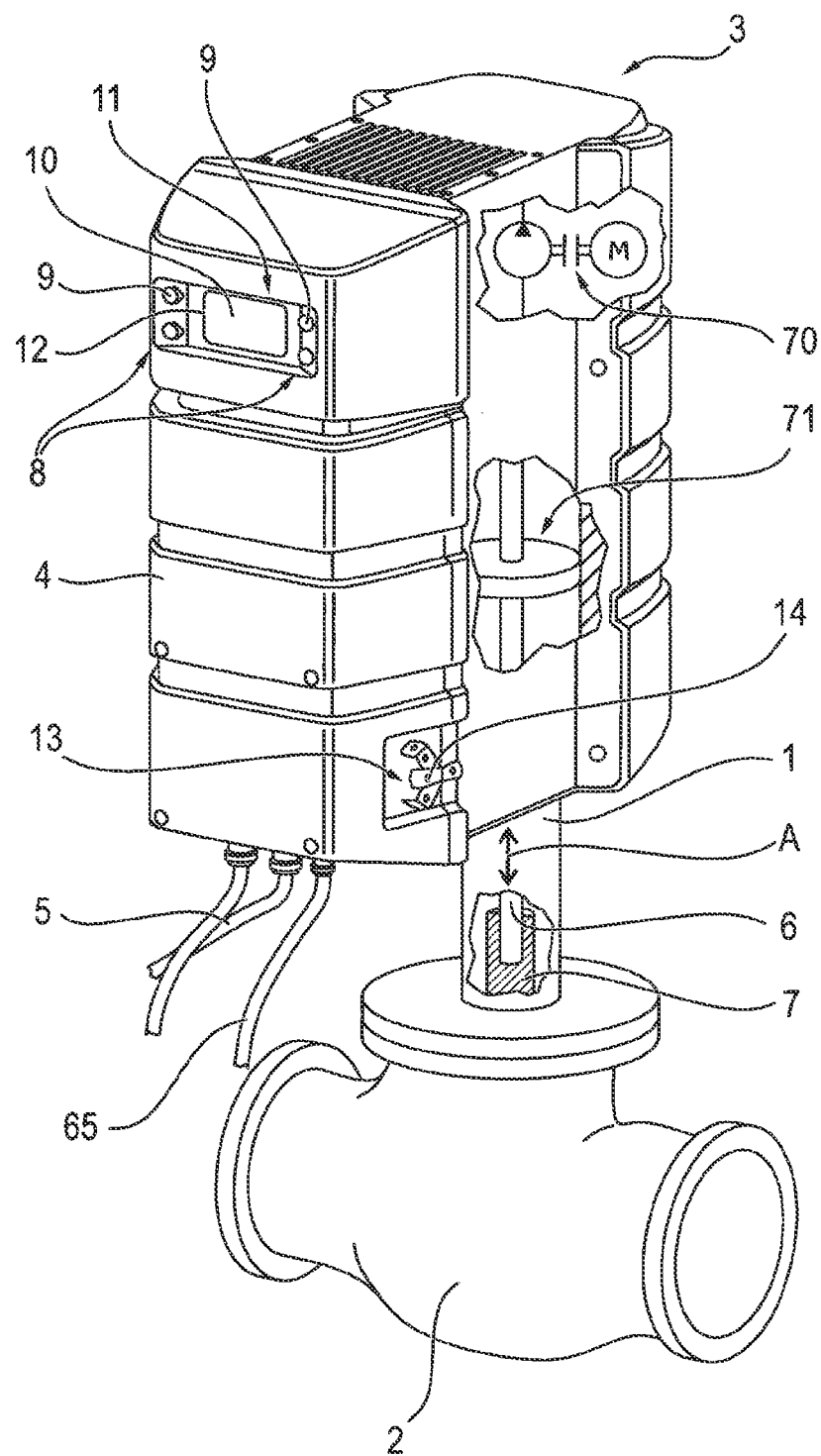
FIG. 1 shows, in perspective view, a drive element according to the present invention, mounted on a flow-regulating valve and used for actuation thereof.

Drive unit 3 illustrated in FIG. 1, mounted via a support structure 1 on flow-regulating valve 2 and used for actuation thereof, comprises a housing 4. This accommodates—in a manner known in itself—an electromechanical transducer group 69, which has an electrical input 5 and a mechanical output 6 and (within the meaning of WO 2011/095351 A1, for example) is of two-stage design, by the fact that it comprises an electrofluidic first transducer stage 70 and a fluid-mechanical second transducer stage 71. Mechanical output 6—executing linear motions (arrow A)—of electromechanical transducer group 69 is coupled with input 7 of flow-regulating valve 2.

Drive unit 3 further has an electronic controller disposed inside housing 4. Adjustments can be made to the controller via an input unit 8. This input unit 8 comprises four pushbuttons 9, which penetrate housing 4 and have segments projecting outward from the housing. These are disposed in respectively two groups adjacent to the two sides of a display 10 which, in addition to input unit 8, is a further part of operator-control interface 11. This is mounted for protection in a trough-like recess 12 of housing 4.

A mode-of-operation switch 13 acting on the controller is also disposed on housing 4. This is designed as rotary knob 14, which can be mechanically interlocked in three positions. For the purpose of remote intervention into the controller as well as for remote monitoring of drive unit 3, the controller is further provided with, in addition to a hard-wired communications interface 65, an interface for wireless data transmission (e.g. with a WLAN or Bluetooth transmission standard).

Display 10 is inserted into housing 4 behind a housing opening 15, i.e. is offset relative to housing opening 15 toward the interior of housing 4. Housing opening 15 is covered on the inside of housing 4 by a protective glass panel 16, which overlaps frame 17 bounding housing opening 15, wherein a peripheral seal 18 is disposed in the region of each overlap. Protective glass panel 16 is fixed in housing 4 by means of a rim 19, which is screwed into a female thread 20 provided on housing 4. Display 10 is also fixed on rim 19 via holder 21.

Pushbuttons 9 are guided displaceably, i.e. by being depressed along their axis (arrow B), in elongated bores 22, which in turn are made in corresponding reinforcements 23 of housing 4. These bores 22 are formed as stepped bores, so that, when respective pushbutton 9 is not being actuated, a collar-like extension 24 of the latter is pressed under the action of a restoring device 26—designed as restoring spring 25—against step 27 of bore 22. In this way, step 27 forms a first stop 28—which defines the home position (non-actuated position) of pushbutton 9 in question. A second stop 29, which limits the travel distance by which pushbutton 9 can be depressed against the action of restoring device 26, is formed by a stop plate 30, which is fixed on reinforcement 23 of housing 4 and cooperates with shoulder 31 formed on pushbutton 9.

Stop plate 30 respectively has an opening 32, through which a switching element 33 present on the end face of pushbutton 9 projects. Switching element 33 is designed as interrupter 34, which cooperates with a photoelectric barrier 35—consisting of an optical light source 66 and a detector 67 disposed opposite it—which is part of a contactless switch 36 assigned to the controller. In other words, upon actuation of pushbutton 9, interrupter 3 penetrates into the measurement gap 37 of photoelectric barrier 35, wherein the switched state of switch 36 in question is changed. For this purpose, it is decisive that the position or end position of pushbutton 9 actuating switch 36 is defined not by switch 36 itself but instead by second mechanical stop 29 explained hereinabove and independent thereof.

Figure 2:
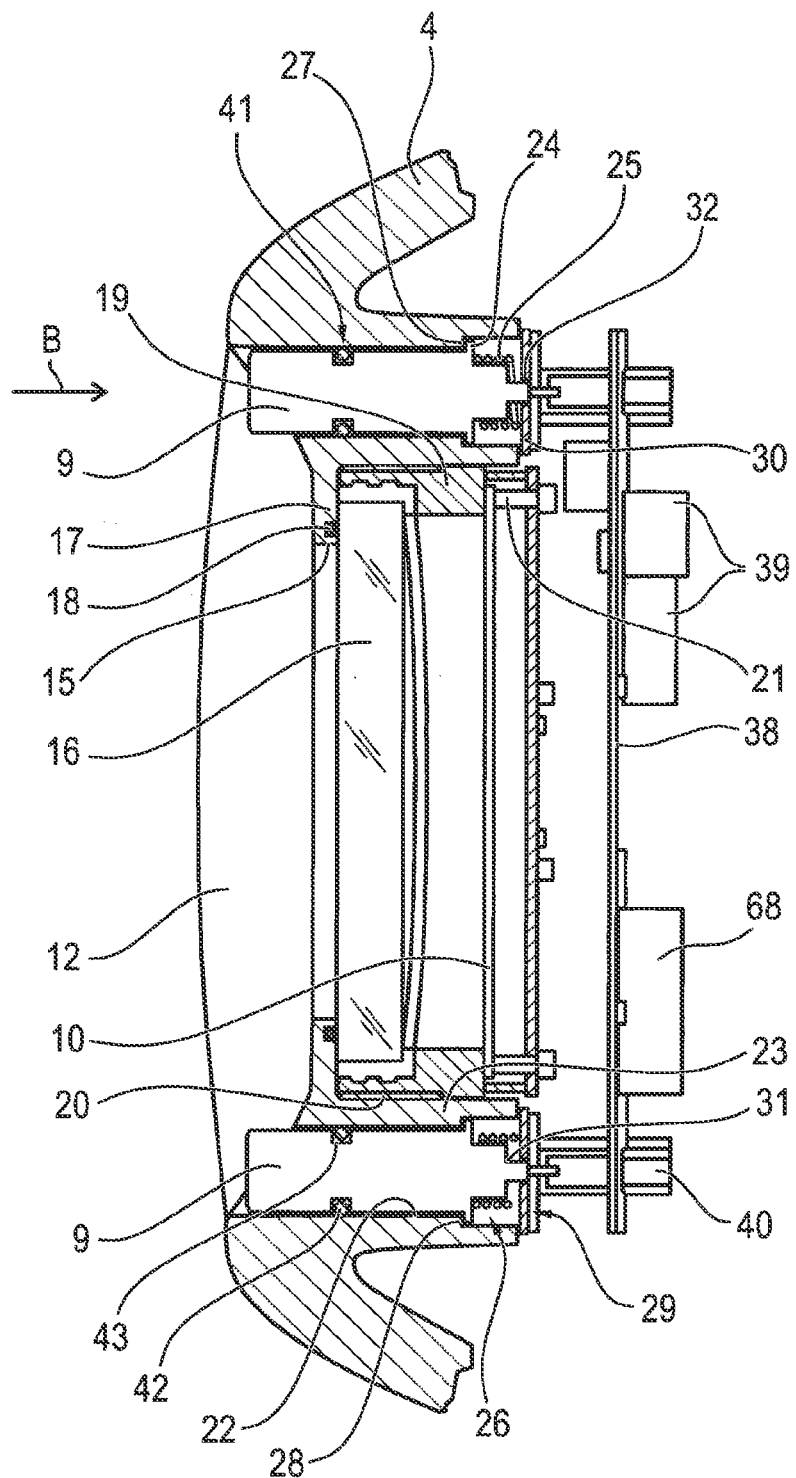
FIG. 2 shows a horizontal section through the drive unit shown in FIG. 1 in the region of its input unit, FIG. 3 schematically shows a pushbutton-switch unit that can be used in the scope of the present invention, FIG. 4 schematically shows a second pushbutton-switch unit that can be used in the scope of the present invention, FIG. 5 schematically shows a third pushbutton-switch unit that can be used in the scope of the present invention, FIG. 6 schematically shows a fourth pushbutton-switch unit that can be used in the scope of the present invention, FIG. 7 schematically shows a fifth pushbutton-switch unit that can be used in the scope of the present invention.

These four switches 36 assigned to the four pushbuttons 9 are disposed directly on a printed-circuit board 38, which also supports further components 39 of the electronic controller and is fixed by means of holder 40 in housing 4. In other respects, pushbuttons 9 are sealed relative to the respective bore 22 by suitable seals 41, in order to prevent ingress of contaminants, especially liquid and gaseous media and dusts, into the interior of housing 4. For this purpose, according to FIG. 2, an O-ring 42 is inserted into a respective annular groove 43 of pushbutton 9 in question. In contrast, FIG. 3, which otherwise schematically illustrates substantially the pushbutton-switch group represented in FIG. 2, shows the positioning of an O-ring 44 in an annular groove 45 provided in bore 22.

Figure 4:
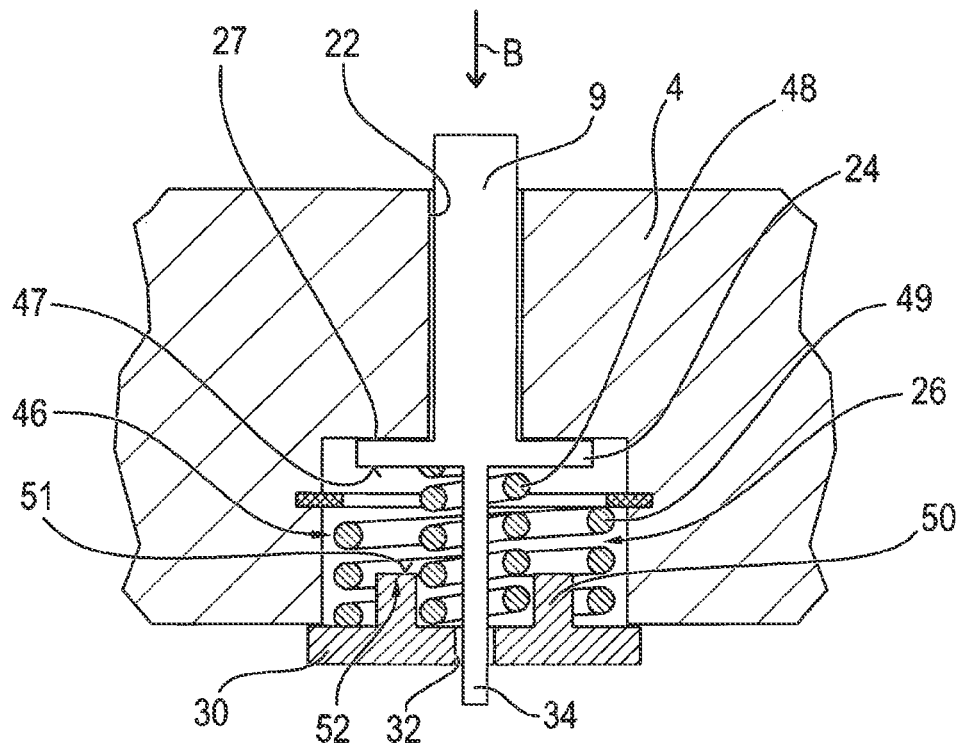

FIG. 4 schematically illustrates the option of implementing restoring device 26 in the form of a two-stage restoring-spring unit 46 acting in the manner of a pressure point. A first restoring spring 48 acts constantly, i.e. in every position of the pushbutton inside bore 22, between stop plate 30 and end face 47 of pushbutton 9. In contrast, a second restoring spring 49—also disposed between stop plate 30 and end face 47 of pushbutton 9—comes to bear on end face 47 of pushbutton 9 only when the latter is depressed—against the force of first restoring spring 48—by a certain amount, which does not yet switch photoelectric barrier 35 (see FIG.

3). A guide and stop sleeve 50 (alternatively, for example, several individual stops could also be considered), which extends between first restoring spring 48 and second restoring spring 49, and end face 51 of which forms the actual second stop 52 by interaction with end face 47 of pushbutton 9, is disposed on stop plate 30.

Figure 3:
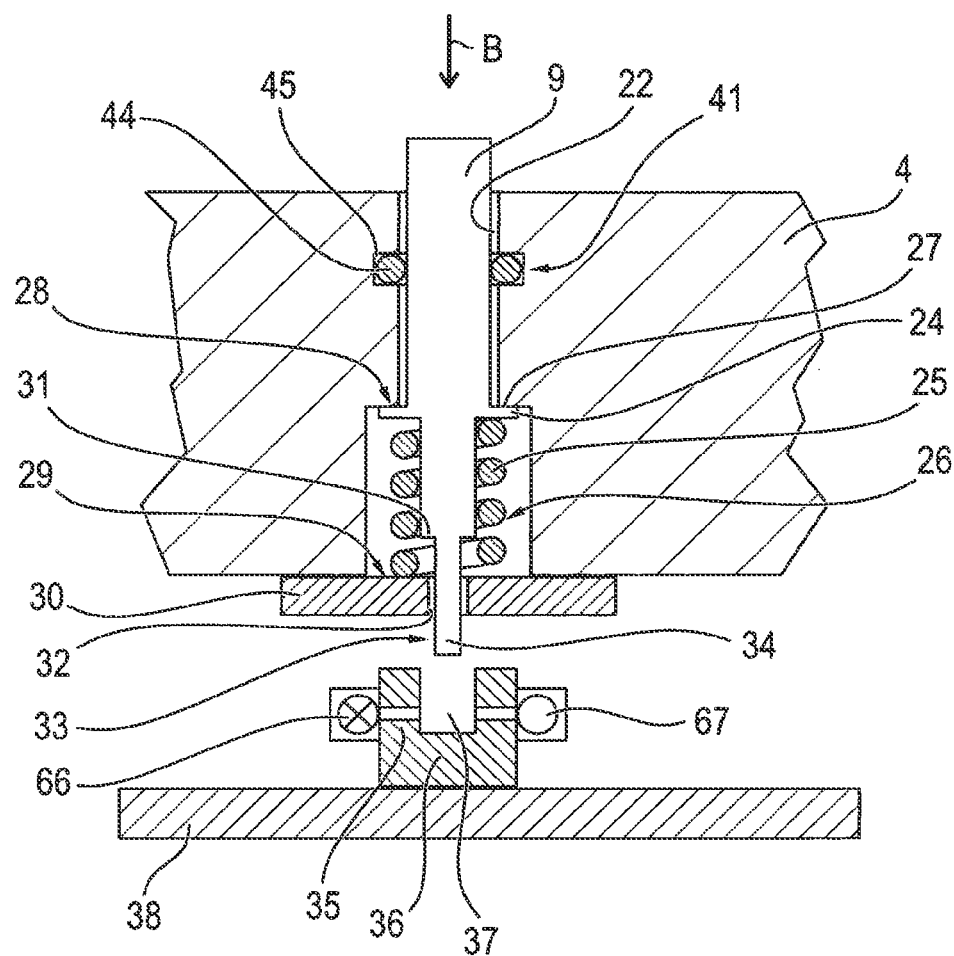
Figure 5:
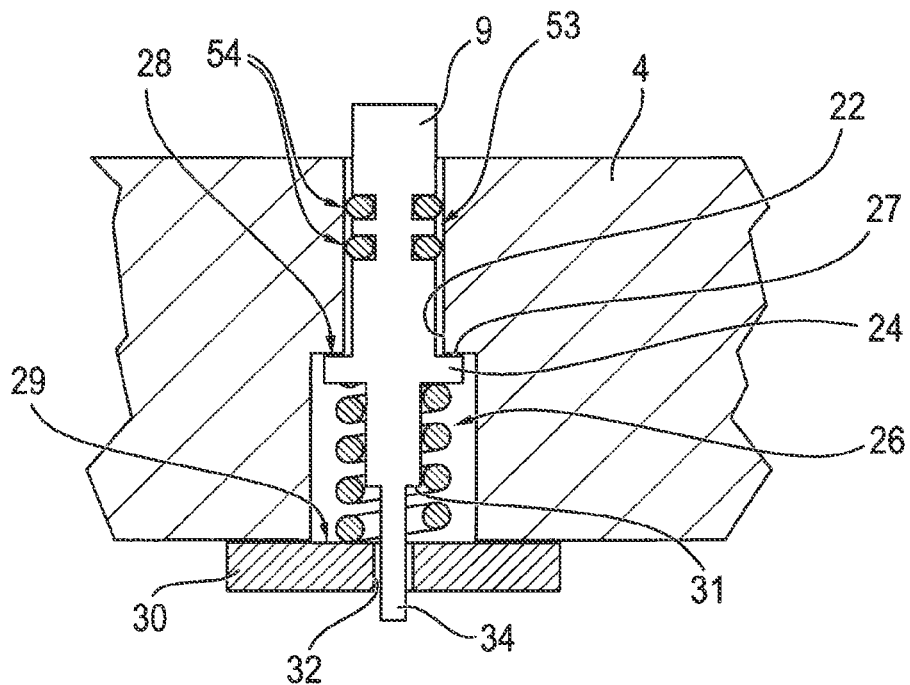

FIG. 5 illustrates, as a modification of FIG. 3, sealing of pushbutton 9 relative to housing 4 by a sealing system 53 with cascade-like double seal 54. This represents—in conjunction with a corresponding design of housing 4—an option for ensuring the necessary protective class against ingress of media during application of drive unit 3 under inhospitable service conditions. At the same time, the maximum air gap relevant for explosion protection is ensured between housing and pushbutton.

Figure 6:
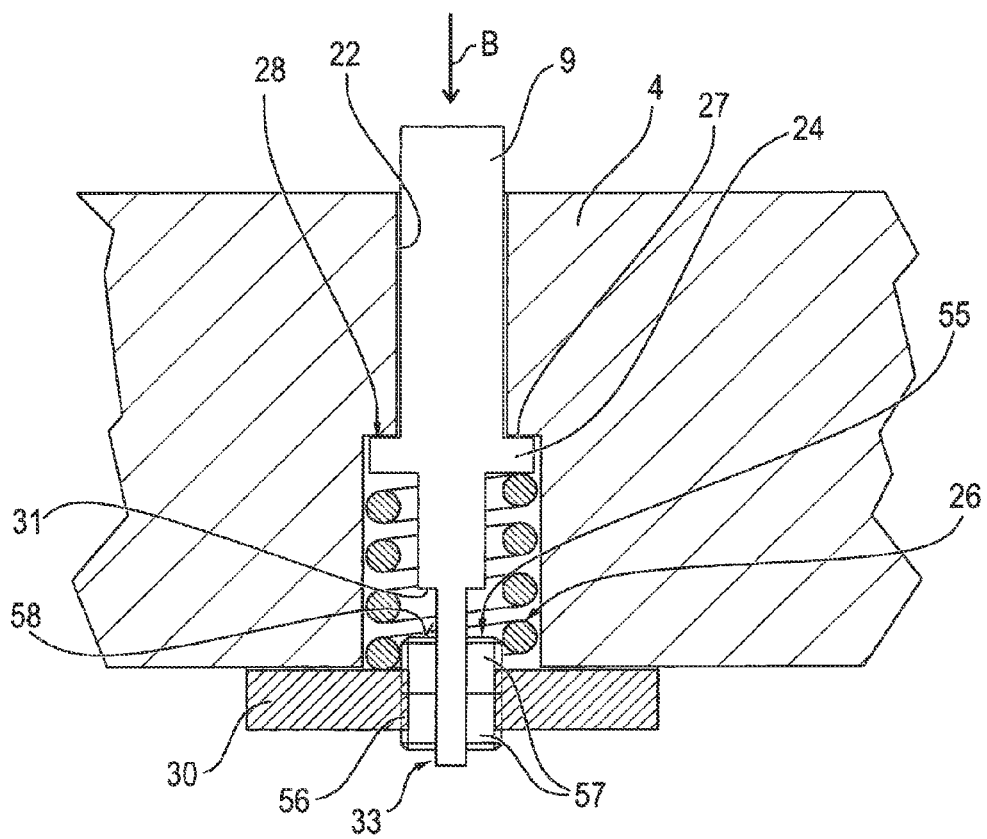

Also as a modification of FIG. 3, FIG. 6 illustrates an option for making second stop 55 adjustable. And, in fact, a stop sleeve 57 is screwed into stop plate 30 fixed on housing 4, namely into a threaded bore 56 provided therein. By turning stop sleeve 57, the end face 58 of which forms the actual second stop 55 by interaction with shoulder 31 of pushbutton 9, the depth of penetration thereof and thus the end position of pushbutton 9 can be varied during actuation thereof (arrow B).

Figure 7:
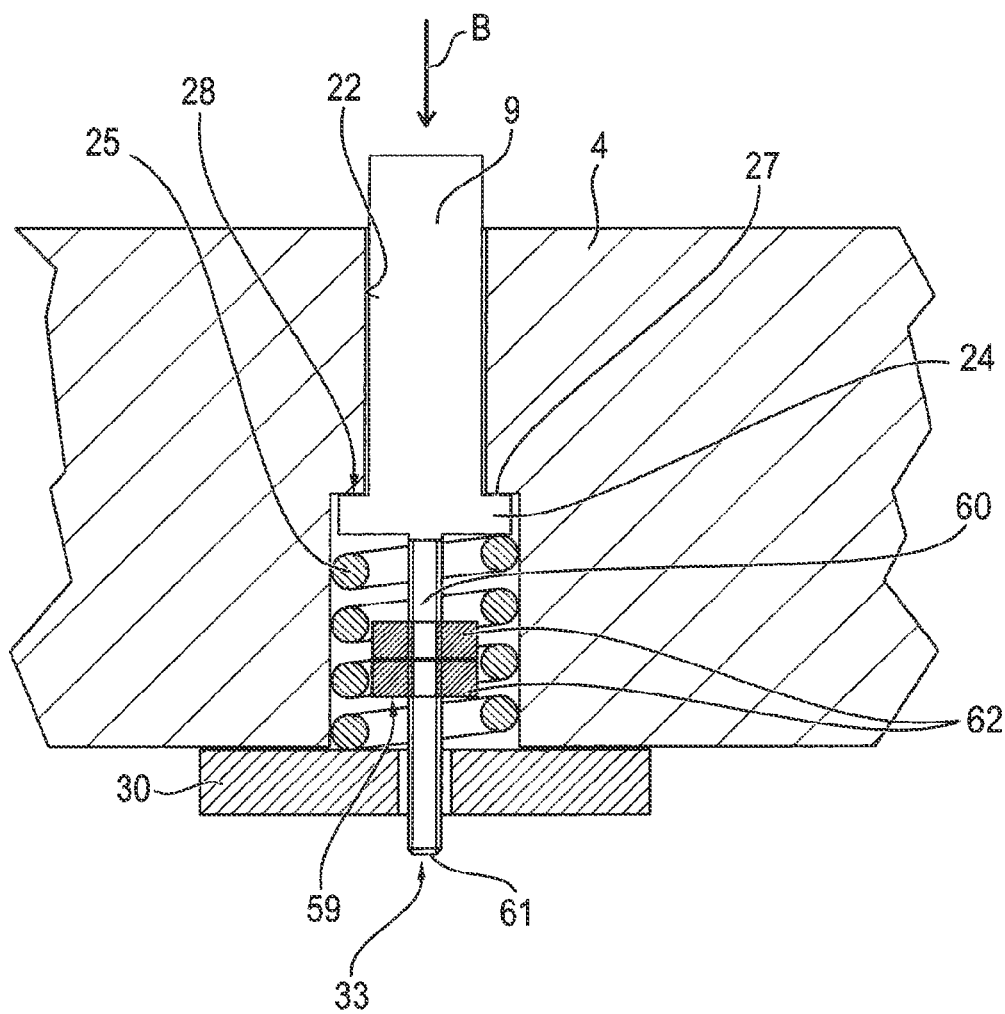

FIG. 7 illustrates a preferred alternative embodiment of an adjustable second stop 59 for pushbutton 9. In this embodiment, projection 60 of pushbutton 9, the end portion 61 of which forms switching element 33 interacting with photoelectric barrier 35 (see FIG. 3) has a male thread, onto which a stop washer 62 provided with a female thread and interacting with stop plate 30 fixed to the housing is screwed. Preferably stop washer 62 comprises two pieces clamped against one another in such a way that unintended loosening during operation is excluded. The end position of pushbutton 9 that operates switch 36 (see FIG. 3) can be varied by turning stop washer 62.

Figure 8:
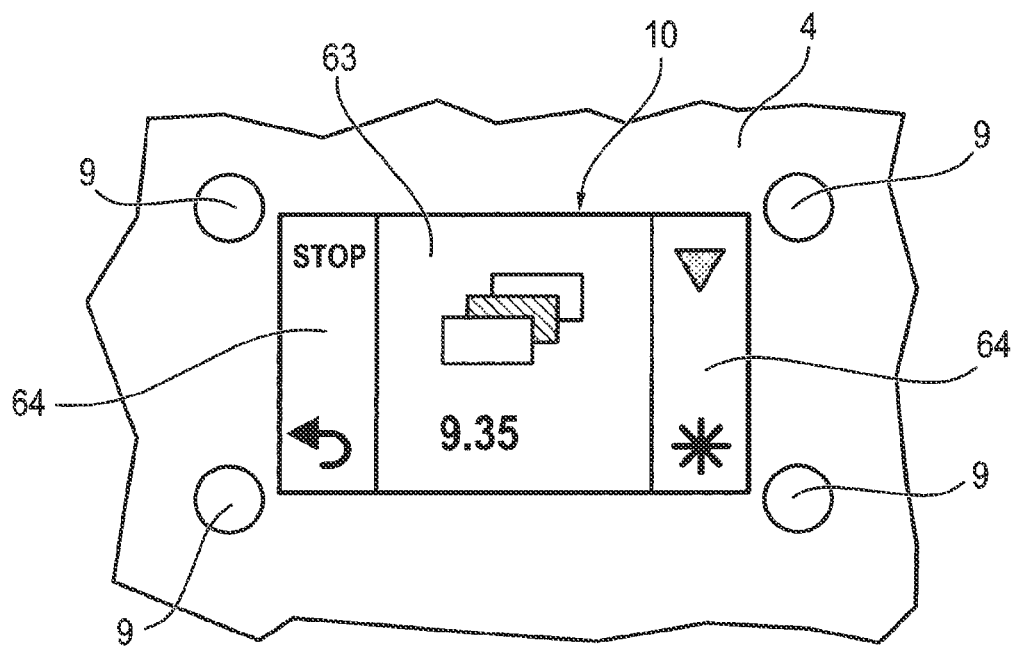
FIG. 8 shows the operator-control interface of the input unit of the drive unit according to FIG. 1 in its vertical arrangement.
Figure 9:
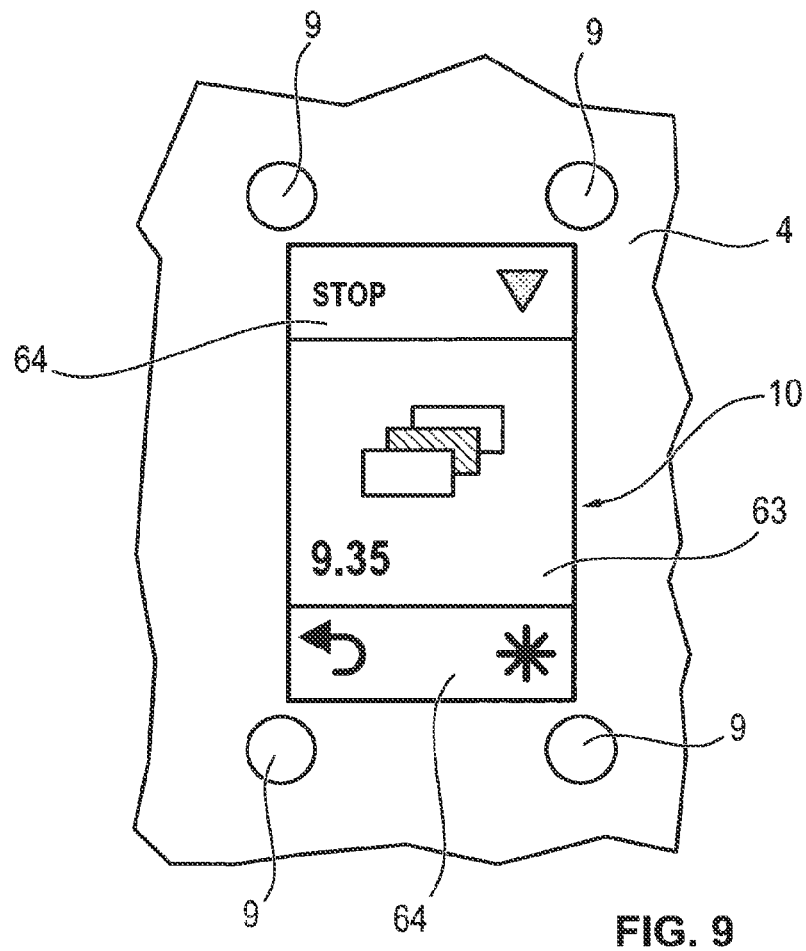
FIG. 9 shows the operator-control interface of the input unit of the drive unit according to FIG. 1 in its horizontal arrangement.

As can be inferred from FIG. 1 and is illustrated in more detail in FIGS. 8 and 9, display 10 has oblong geometry. The screen area is subdivided into three parts. It comprises an approximately square operating-information area 63 occupying the middle part of the display and two lateral actuation-information areas 64 adjacent to pushbuttons 9. The current control-related function, which is allocated respectively to the individual pushbuttons 9 and which depends both on the respective menu level of the controller and on the installation position of drive unit 3, is indicated in the two actuation-information areas 64.

Drive unit 3 comprises an installation-position sensor 68. The indication of the operating information and of the pushbutton assignment on display 10 takes place automatically depending on the respective installation position of drive unit 3 determined by installation-position sensor 68, i.e. the vertical installation position (shown in FIG. 1), a horizontal installation position (rotated by 90°) or else a hanging installation position (rotated by 180°). FIG. 8 shows operator-control interface 11 with an exemplary indication, on display 10, of operating information as well as actuation information for a vertical installation position (FIG. 1) of drive unit 3. The indication of display 10 for identical operating situation but horizontal installation position of drive unit 3 rotated by 90° is illustrated in FIG. 9. Because the signal of the installation-position sensor is taken appropriately into consideration in the controller, the corresponding orientation of the indication of the operating information appears for all installation positions of drive unit 3 (direction in space) in operating-information area 63, as does a corresponding arrangement (direction in space) of the functional assignment of the four pushbuttons 9 (top left: "Emergency shutdown", bottom left: "Back one level", top right: "Scroll", bottom right: "Acknowledge") in the two actuation-information areas 64. Furthermore, this "Emergency shutdown" function is always allocated to the top left pushbutton 9, even in all menu levels.

What is claimed is:

1. A drive unit (3), especially for actuation of flow-regulating valves (2), comprising a housing (4), an electrical input (5), an electromechanical transducer group (69), a mechanical output (6) and an electronic controller, wherein the controller has an electronic display (10) and comprises an input unit (8) with several pushbuttons (9) that penetrate the housing (4), are disposed adjacent to the display (10) and can be depressed against the action of a restoring device (26),
   characterized by contactless switches (36) actuated by the pushbuttons (9), wherein mechanical stops (29, 52, 55, 59) independent of the switches (36) themselves are assigned to the positions of the pushbutton (9) actuating the switches (36), wherein further the assignment of the switching functions active in the controller to the individual pushbuttons (9) can be varied and the display (10) comprises an operating-information area (63) and at least one actuation-information area (64) adjacent to the pushbuttons (9), wherein the current assignment of the function to the individual pushbuttons (9) is indicated in the actuation-information area (64), and wherein the electromechanical transducer group (69) comprises an electrofluidic first transducer stage (70) and a fluid-mechanical second transducer stage (71).

2. The drive unit of claim 1, wherein at least one switch (36) is of optical design, especially by comprising a photoelectric barrier (35).

3. The drive unit of claim 1, wherein at least one switch (36) is disposed directly on a printed-circuit board (38) supporting further components (39) of the electronic controller.

4. The drive unit of claim 1, wherein the housing (4) is of explosion-protected design and the pushbuttons (9) are sealed relative to the housing (4) by means of an explosion-protected sealing system (53).

5. The drive unit of claim 4, wherein the sealing system (53) is of cascade-like design and comprises at least one double seal (54).

6. The drive unit of claim 1, wherein the restoring device (26) comprises a two-stage restoring-spring unit (46) acting in the manner of a pressure point.

7. The drive unit of claim 1, wherein the mechanical stop (55, 59) is adjustable.

8. The drive unit of claim 1, wherein an installation-position sensor (68) is provided, wherein the switching functions are automatically allocated in the controller to the individual pushbuttons (9) in a manner dependent on the signal of the installation-position sensor.

9. The drive unit of claim 1, wherein an installation-position sensor (68) is provided, wherein the orientation of the indication of operating information in an operating-information area (63) of the display (10) is determined automatically depending on the signal of the installation-position sensor.

10. The drive unit of claim 1, wherein the display (10) has an oblong format and at least two pushbuttons (9) are provided, which are disposed in groups on two short sides of the display (10), while the display (10) has a central, substantially square operating-information area (63) and two laterally disposed actuation-information areas (64).

11. The drive unit of claim 1, wherein the controller is provided with an external hard-wired communications interface (65) as well as with an interface for wireless data transmission.

12. The drive unit of claim 1, wherein a mode-of-operation switch (13), which acts on the controller and preferably can be mechanically interlocked, is mounted on the housing (4).

13. A drive unit (3), especially for actuation of flow-regulating valves (2), comprising a housing (4), an electrical input (5), an electromechanical transducer group (69), a mechanical output (6) and an electronic controller, wherein the controller has an electronic display (10) and comprises an input unit (8) with several pushbuttons (9) that penetrate the housing (4), are disposed adjacent to the display (10) and can be depressed against the action of a restoring device (26), characterized by contactless switches (36) actuated by the pushbuttons (9), wherein mechanical stops (29, 52, 55, 59) independent of the switches (36) themselves are assigned to the positions of the pushbutton (9) actuating the switches (36), wherein further the assignment of the switching functions active in the controller to the individual pushbuttons (9) can be varied and the display (10) comprises an operating-information area (63) and at least one actuation-information area (64) adjacent to the pushbuttons (9), wherein the current assignment of the function to the individual pushbuttons (9) is indicated in the actuation-information area (64), and wherein the restoring device (26) comprises a two-stage restoring-spring unit (46) acting in the manner of a pressure point.

* * * * *